United States Patent [19]

Schlanger

[11] Patent Number: 4,552,381
[45] Date of Patent: Nov. 12, 1985

[54] PASSENGER RESTRAINT SAFETY SYSTEM

[76] Inventor: Samuel L. Schlanger, 140 Cheyenne Way, Wayne, N.J. 07470

[21] Appl. No.: 579,689

[22] Filed: Feb. 13, 1984

[51] Int. Cl.[4] .............................................. B60R 21/00
[52] U.S. Cl. .................................. 280/752; 296/65 A
[58] Field of Search ...................... 280/748, 751, 752; 296/65 R, 65 A

[56] References Cited

U.S. PATENT DOCUMENTS

| 2,322,755 | 6/1943 | Voorhies | 280/751 |
| 2,983,545 | 5/1961 | Garvey et al. | 296/65 R |
| 3,832,000 | 8/1974 | McDonnell | 296/65 A |
| 3,843,155 | 10/1974 | Foster | 280/751 |
| 3,951,429 | 4/1976 | Srotzinger | 280/751 |
| 4,089,545 | 5/1978 | Ferry | 280/751 |
| 4,300,788 | 11/1981 | Sperling | 280/748 |

FOREIGN PATENT DOCUMENTS 1153276  8/1963  Fed. Rep. of Germany ...... 280/748

Primary Examiner—Joseph F. Peters, Jr.
Assistant Examiner—Ross Weaver
Attorney, Agent, or Firm—Collard, Roe & Galgano

[57] ABSTRACT

There is provided a passenger restraint safety system for a passenger type automobile having a chassis, a passenger seat and a door providing access to said passenger seat. The seat is mounted for free unrestrained forward movement on a track system which includes locking means to maintain said seat in a predetermined position. Forward of said seat is a safety cushion contoured to the body of a passenger in the seated position. Release means, which are activated by a collision of said automobile with another object, release the locking means positioning said seat allowing the seat to move forward thereby restraining the passenger between said seat and said safety cushion. To allow the passenger easy access to the interior of the automobile and to be seated therein, provision is made to collapse the safety cushion when the door is opened. Alternatively, to allow easy ingress and egress, the seat may be adapted to move rearwardly by electro-mechanical means upon the opening of the automobile door and, upon the closing of the door, the seat is returned to a predetermined position, or the passenger may activate the return to a desired position.

12 Claims, 9 Drawing Figures

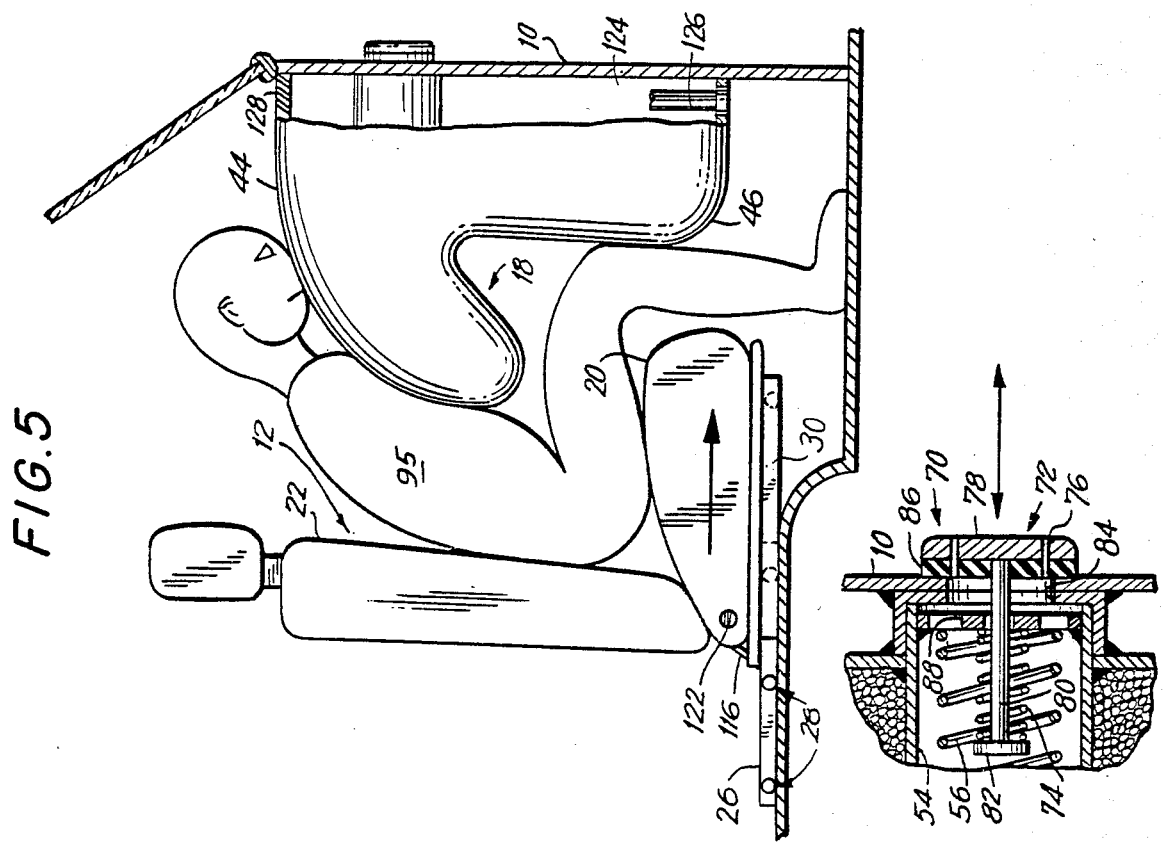
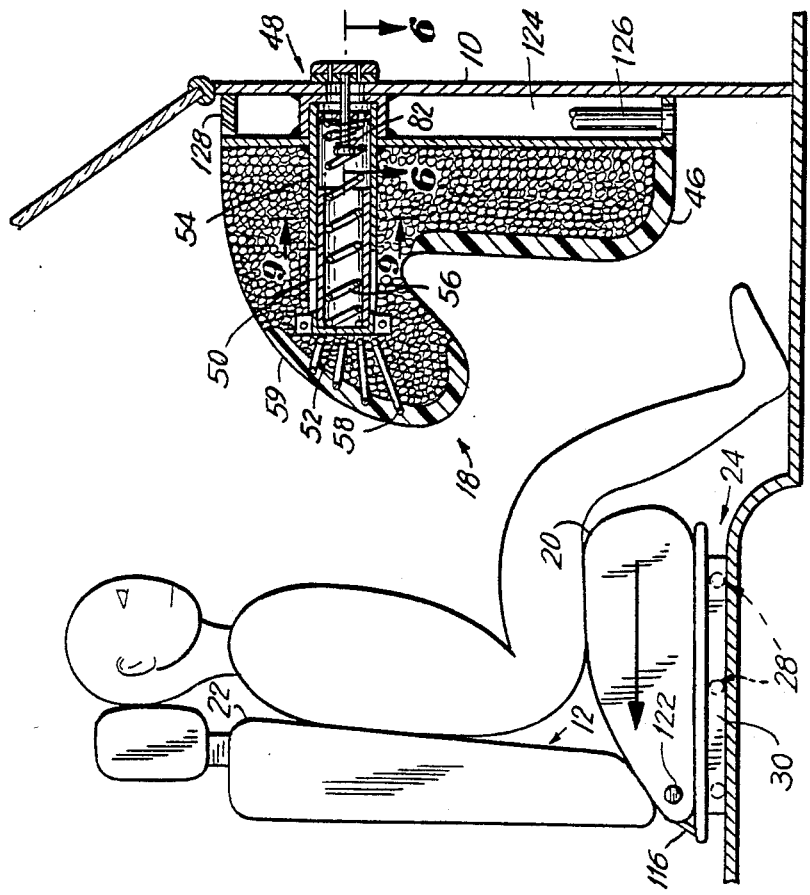

PASSENGER RESTRAINT SAFETY SYSTEM

Reference is made to my co-pending application Ser. No. 579,690, filed 2/13/84 entitled "Vehicle Control Safety System" filed concurrently herewith and the subject matter of which is incorporated herein by reference.

The present invention relates to safety systems for vehicles and more particularly it relates to an active passenger restraint safety system the purpose of which is to protect the occupants of a vehicle from a second collision within the vehicle involving the occupants and interior objects within the vehicle.

In recent years there has been an increased emphasis on the need for greater safety for vehicles, in particular passenger automobiles, so that the incidence of passenger fatalities and injuries resulting from collisions with other automobiles or objects is reduced. This emphasis has resulted in improvements to passenger automobiles which relate to both their handling characteristics as well as their crash worthiness. The improvement in the crash worthiness of automobiles has for its purpose the avoidance or limitation of damage to automobiles and passengers in the event of collisions.

Another means of attempting to avoid or limit injury to the occupants of automobiles has been passenger restraint systems which are designed to prevent the so-called second collision within the vehicle between the passenger and interior objects during a front end collision. Examples of such restraint devices that people are most familiar with are seat belts and shoulder harnesses. Such devices are generally passive restraint devices since they are designed to restrain the passenger or driver in his seat during a collision and the collision itself does nothing to trigger the implementation of the device. In such passive restraint devices it is usually left to the occupant to implement the device and if he or she fails to do so, a dangerous situation may develop in a collision. It is often the case that automobile passengers and drivers fail to buckle their seat or shoulder harness belts for the reason that such devices are felt to be uncomfortable or restrain movement to an unacceptable degree and seat or shoulder harness belts are too narrow and are inadequate for good protection and the safety of passengers. Furthermore, such seat belts and shoulder harness belts often provide inadequate passenger protection during a collision. The seat belt allows free upper body movement, which may be dangerous in a collision. A system which employs the use of both belts by the passenger affords better protection, but this only increases the discomfort and inconvenience of the passenger and results in greater non-use. One such belt system on the market employing both seat and harness type belts operates automatically upon the entering of the automobile by the occupant.

Another approach to passenger restraints, so-called active restraints, involve devices for restraining the passenger or driver during a front end collision which are activated only upon the eventuality of a collision. One example of an active restraint is the controversial air bag. The air bag is positioned in front of the forward passenger seat below the dashboard in an uninflated condition and is designed to be activated or triggered by a front end collision of the vehicle. Upon activation, the air bag is automatically inflated to expand into the front passenger compartment to thereby restrain the driver and passenger from colliding with interior objects in the vehicle. Unfortunately, the air bag restraint system has been beset with problems relating to inadvertent inflation of the air bag which itself can result in a dangerous condition and injury to the driver or passenger. The air bag on the driver's side is mounted in the hub of the steering wheel and when inflated blocks the driver's vision resulting in a dangerous situation while the vehicle is traveling, at any rate of speed. Also, the rate of inflation of air bags is slow, thereby greatly limiting their effectiveness during a collision at relatively higher speeds. Upon such activation of an air bag system, the replacement of the activating parts of the system are often costly and time consuming.

It is, therefore, a primary object of the present invention to provide a passenger restraint safety system for a passenger automobile which provides increased safety, which does not require occupant implementation, does not cause discomfort or inconvenience or in any other way hamper the driver or passenger of a motor vehicle during vehicle operation, may be utilized in connection with both the back and front seats of an automobile as well as for trucks, trailers, etc. and which eliminates the need for seat belts, shoulder harnesses or airbag systems.

The above object, as well as others which will hereinafter become apparent, is accomplished in accordance with the present invention by the provision in a passenger automobile having a chassis, a passenger seat, and a door hingedly connected to said chassis providing access to said seat, of a track system for said passenger seat which permits unrestrained movement of the seat in the forward direction, a safety cushion positioned and fixed in front of the passenger seat which is contoured to the body of the passenger in the seated position, a locking means for locking the seat in a position at a pre-determined distance from the safety cushion to allow free and unrestrained movement of the passenger in said seat, and means for releasing the locking means. The locking means release is triggered by a collision of the automobile with another object thereby releasing the seat for unrestrained free movement on the track system and allowing the forward momentum of the passenger and seat to propel the seat forwardly toward the safety cushion and restraining the passenger therebetween. Means are also provided for collapsing the safety cushion when the door is opened to allow the passenger easy access to the interior of the vehicle and to be seated therein. Alternatively, to allow easy ingress and egress, the seat may be adapted to move rearwardly by electromechanical means upon the opening of the automobile door and, upon the closing of the door, the seat is returned to a predetermined position, or the passenger may activate the return to a desired position.

The present invention will be described and understood more readily when considered together with the accompanying drawings, in which:

FIG. 4 is a schematic side elevational view, partly in cross-section, similar to that of FIG. 1 showing the riding position and use of the passenger restraint safety system of the present invention in the front passenger seat of a passenger automobile;

FIG. 5 is a schematic side elevational view similar to that of FIGS. 1 and 4 and showing the effect of the passenger restraint safety system of the present invention during a collision;

FIG. 6 is an enlarged cross-sectional view taken along the line 6—6 of FIG. 4;

Figure 1:
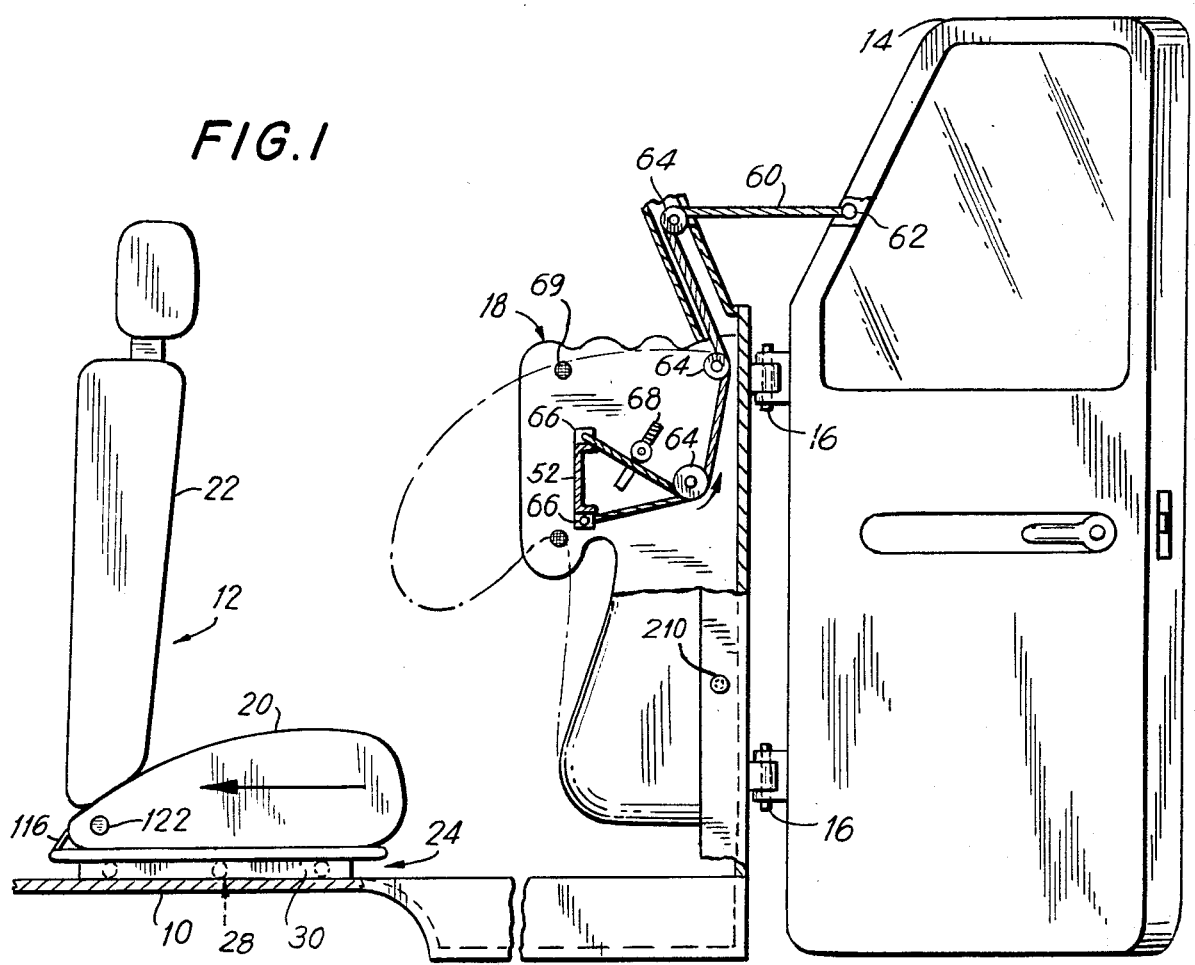
FIG. 1 is a schematic side elevational view, partly in cross-section, of part of a passenger automobile having the passenger restraint safety system of the present invention.

Now turning to the drawings, there is shown in FIG. 1 a chassis, generally designated 10, for a passenger automobile having a passenger seat, generally designated 12, mounted thereon and a door, generally designated 14, hingedly connected to chassis 10 by means of hinges 16, and a safety cushion, designated 18. Door 14 is shown in FIG. 1 to be hingedly connected to chassis 10 by means of hinges 16 positioned on chassis 10 forwardly of seat 12 to provide easy access thereto by a passenger. However, it is within the scope of the present invention that the door 14 may also open rearwardly or upwardly.

Figure 3:
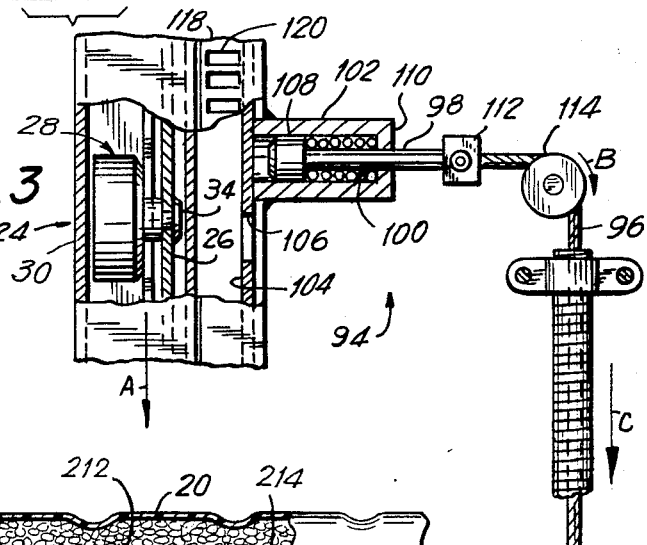
FIG. 3 is an enlarged view, partly in cross-section, of the suspension track system of FIG. 2 taken along the line 3—3 of FIG. 2.
Figure 2:
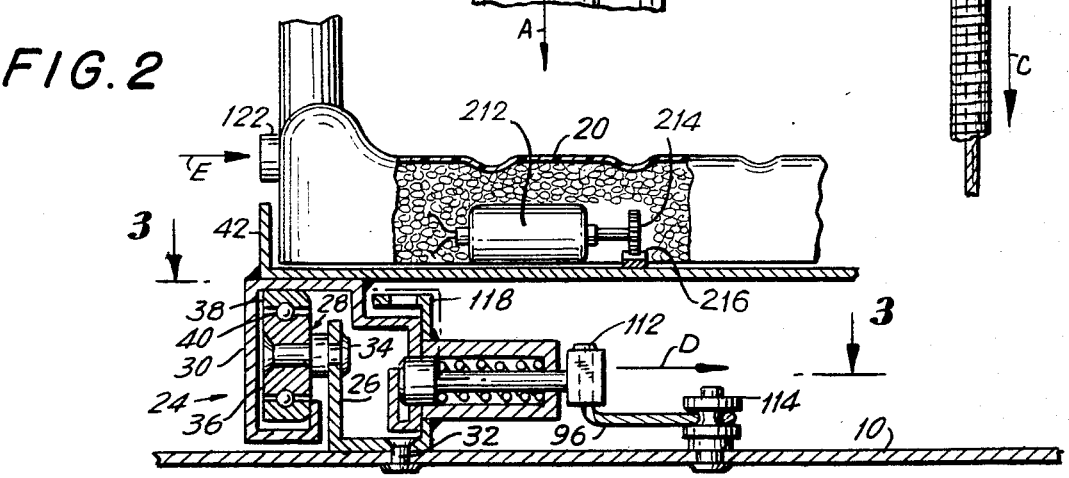
FIG. 2 is a partial front elevational view, partially in cross-section, of a portion of the vehicle seat of FIG. 1 showing the suspension track system therefor.

Passenger seat 12, which may be provided with the usual seat adjustments, generally includes a seat portion, designated 20, and a backrest portion, designated 22, and is mounted to chassis 10 by means of the guide track arrangement, generally designated 24, shown in FIGS. 2 and 3. At least two guide track arrangements 24 must be provided for each seat 12. As seen in FIGS. 2 and 3, guide track arrangement 24 basically consists of an upstanding wheel support, designated 26, a series of wheels, designated 28, and a wheel track, designated 30. Wheel support 26 is positioned in the longitudinal direction of chassis 10 and is mounted thereto by any suitable means such as recessed rivets 32. A plurality of wheels 28 are mounted to wheel support 26 in the longitudinal direction for supporting passenger seat 12. Wheels 28 are mounted for rotation to wheel support 26 by means of axle pins 34 and comprise a hub, designated 36, and a ring or race portion, designated 38, circumferentially mounted on hub 36 by means of ball bearings 40. Wheel track 30 is basically "C" shaped for the purpose of providing a guide for wheels 28 and is fixedly mounted to the frame, designated 42, of passenger seat 12.

Safety cushion 18 is formed, as clearly seen in FIG. 5, to provide a large body contact area having an upper body section, designated 44, for the purpose of cushioning a passenger's head and chest area and a lower leg portion, designated 46, for cushioning the passenger's legs. Sections 44 and 46 of safety cushion 18 are so contoured to substantially match the seated position of the human body as demonstrated by the dummy in FIG. 5. The material utilized in safety cushion 18 may be of any suitable material capable of providing a high degree of cushioning effect for a passenger in a front end collision. Foam like materials are an example of a suitable cushioning material. The plastic sheathing of all safety barriers are reinforced where needed for wear, primarily at the chest and knee areas, as clearly seen in FIGS. 4, 7 and 8.

For passenger convenience there is provided, as seen in FIGS. 1 and 4, means for collapsing safety cushion 18 to such an extent as to allow sufficient room for ingress and egress to and from the automobile. Also, adequate support must be provided to safety cushion 18 to maintain it in its safety mode. Thus, for this purpose a safety cushion support and compression system, generally designated 48, is provided. Safety cushion support and compression system 48, which is connected to and supported by chassis partition 10, consists of a reciprocable plunger, designated 50, a channel member, designated 52, and a plunger guide, designated 54. Plunger 50 is positioned within collapsible safety cushion 18 and its end closest to passenger seat 12 is connected to channel member 52 which extends across safety cushion 18. Obviously, an adequate amount of cushioning material must be provided between channel member 52 and the outer fabric or sheathing of safety cushion 18 in order to cushion the passenger therefrom during a collision. Plunger 50 is reciprocally movable within plunger guide 54 which is mounted to chassis partition 10 and to the fire wall and extends horizontally into safety cushion 18. The dual fire-wall partition in addition to providing a strong support for mounting the reciprocal cylinder assembly 48 as shown in FIG. 4, also serves as a baffle to reduce the level of noise emitted by the car's engine into the passenger compartment.

It is to be noted that the bulk of the dashboard's static safety barriers also provides good acoustics for the comfort of all passengers.

Figure 8:
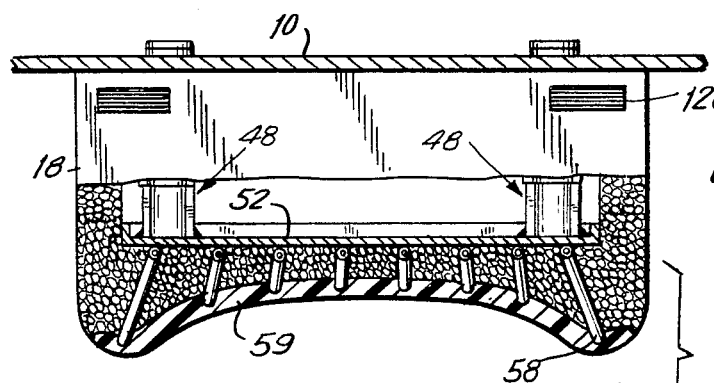
FIG. 8 is a plan view, partly in cross-section, of the restraining effect of the passenger seat and the passenger restraint safety system of the present invention.

A compression spring, generally designated 56, maintains plunger 50 in an extended position within collapsible safety cushion 18. Channel 52 is connected by means of laces, designated 58, to the outer fabric 59 of upper body portion 44 of safety cushion 18. Fabric 59 may be any suitable flexible material such as plastic, naugahide, etc. Thus, a movement of plunger 50 against the biasing action of spring 56 will result in the collapse of safety cushion 18 to the compressed position shown in solid lines in FIG. 1. In order to cause this movement of plunger 50 away from passenger seat 12, a cable and pulley system is arranged, as shown in FIG. 1, to operate upon the opening and closing of automobile door 14. A cable, generally designated 60, is attached at one end to door 14 at point 62 and guided about a series of pulleys, designated 64, so that its other end may be attached to plunger 50 or channel 52. This end of cable 60 may be bifurcated as seen in FIG. 1 and attached to channel 52 or the end of plunger 50 at cable connections 66. A tensioner, designated 68, may be provided for taking up on the tension of the bifurcated portion of cable 60. In this manner, when door 14 is opened, cable 60 is pulled by the door from the body of the vehicle and is guided by pulleys 64 in the direction of the arrow thereby collapsing plunger 50 against the pressure of spring 56. Because channel 52 is attached to the upper body portion 44 of collapsible safety cushion 18 as seen in FIG. 8, the safety cushion will likewise collapse. This is clearly seen in FIG. 1 where the protection or safety position of safety cushion 18 is shown in phantom and its collapsed or compressed position upon door 14 being opened is shown in solid lines. Screened air ports or vents, designated 69, may be provided in safety cushion 18 for the purpose of allowing air to enter and exit from the safety cushion.

In order to control the movement of collapsible safety cushion 18 as it is returned to its safety position, an air check valve system, generally designated 70, is provided. Without air check valve system 70, the return of safety cushion 18 to its safety position would be very abrupt due to the release of the compressive forces of spring 56 and very likely disconcerting to the automobile passenger having just entered the automobile. Thus, air check valve system 70 is incorporated into safety cushion compression system 48 which otherwise is a sealed unit, as clearly seen in FIG. 4. Air check valve system 70 consists of a valve, designated 72, a valve spring, designated 74, and air bleed valve openings, designated 76. Valve 72 consists of a valve head, designated 78, a valve stem, designated 80, and a spring retainer, designated 82. A valve opening, designated 84, is provided in the bulkhead or partition of chassis 10 for the purpose of allowing the air in plunger guide 54 to escape during the compression of plunger 50. Valve head 78 of air valve system 70 is provided with a resilient sealing member, designated 86, at the valve face thereof for the purpose of sealing valve opening 84. Valve spring 74 is maintained between spring retainer 82 of valve 72 and spring seat 88 so that valve opening 84 is normally sealed by valve head 78. Valve spring 74 is provided with such a spring pressure that upon the opening of door 14 and the movement of plunger 50 of safety cushion compression system 48 so as to collapse safety cushion 18, the air pressure developed by the compression of plunger 50 against valve head 78 is sufficient to overcome the spring pressure and valve 72 is thereby opened to allow the air to escape through valve opening 84. When the collapsing movement of plunger 50 has ceased and air is no longer being exhausted from safety cushion compression system 48, valve 72 closes and seals upon valve opening 84. When the passenger has seated himself and closed door 14, the pulling force exerted by cable 60 on plunger 50 is relieved thus allowing spring 56 to exert a force on plunger 50 tending to return it to its normal position so that safety cushion 18 is in its safety position. However, with valve 72 closed, this has the effect of holding back plunger 50 and not permitting it to return under the pressure of spring 56. A return is thus conducted in a controlled environment with air bleed valve openings 76 which are provided in valve head 78 of valve 72. Air bleed valve openings 76 have the effect of throttling the return of air to the otherwise sealed safety cushion compression system 48.

Figure 9:
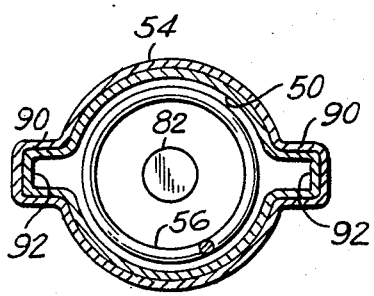
FIG. 9 is an enlarged, cross-sectional view, taken along the line 9—9 of FIG. 4.

In order to prevent rotational movement of channel 52 and thus distorting safety cushion 18, plunger 50 and plunger guide 54 are provided with means for maintaining the attitude of plunger 50. As clearly seen in FIG. 9, this consists in providing at least one longitudinal fluted groove, designated 90, in the side wall of plunger guide 54 and mating protuberances, designated 92, in the side wall of plunger 50. Thus, the attitude of plunger 50 during its movement along plunger guide 54 is continuously maintained.

It is also possible to collapse safety cushion 18, so as to allow sufficient room for ingress and egress to and from the automobile, by means of a suitable pneumatic or hydraulic cylinder unit or an electro-mechanical mechanism operated by electrical switch 210 in FIG. 1. Thus, upon opening automobile door 14, an electric circuit is completed by switch 210 which either hydraulically or electro-mechanically causes channel member 52 to be retracted toward the front of the automobile, thereby collapsing safety cushion 18 and allowing the passenger to enter or exit the automobile.

An alternative arrangement for permitting ingress and egress to and from the automobile can take the form of means for automatically moving seat 12 rearwardly upon the opening of door 14 to such an extent as to allow sufficient room for the passenger to enter the automobile and be seated. Upon the closing of automobile door 14, seat 12 is then automatically returned to its normal or a predetermined position. It is also possible to allow the passenger to move the seat by usual electromechanical devices or even manually to that position selected by the passenger. Thus, as clearly seen in FIG. 2, an electric motor, designated 212, may be mounted to seat 12 below seat portion 20. A pinion gear, generally designated 214, is driven by electric motor 212 and engages a rack gear, designated 216, fixedly mounted to frame 42 of seat 12. Seat 12 is adapted to be slideably moveable on frame 42 so that upon activation of motor 212, seat 12 will be moved forwardly or rearwardly as the case may be. Electric motor 212 may be activated by a switch mounted in the door frame which is activated by the opening of door 14. Such a switch, for instance electrical switch 210, closes the electric circuit to motor 212 when door 14 is opened and by means of rack and pinion gears 216 and 214, seat 12 is moved rearwardly as shown by the arrow in FIGS. 1 and 4 to a predetermined position allowing sufficient room for the passenger or the driver, as the case may be, to enter into the vehicle and be seated. Upon closing of the door, switch 210 may again be activated to activate motor 212 in the reverse direction and return seat 12 to a predetermined position within the seating comfort range of the passenger or driver. It is also possible to provide a manually operated switch operable by the passenger so that the passenger can determine to what position he or she desires to move the seat 12.

As pointed out above, the object of the present invention is to protect the passenger of a motor vehicle during a collision by entrapping or firmly holding the passenger between the cushioned seat 12 and the safety cushion 18 so that collisions between the passenger and interior objects in the automobile are avoided. In order to accomplish this, passenger seat 12 is instantaneously moved forward by the stored-up kinetic energy during the impact resulting from a collision to the point where the passenger seated therein is firmly held between the seat 12 and safety cushion 18. This is clearly demonstrated by FIGS. 5 and 8. Since this action is designed to occur so quickly, there is insufficient time for the passenger to become separated from his seat before he is entrapped in the seated position between the safety cushion and the seat. In order to accomplish this, a release mechanism, designated 94 and shown in FIGS. 2 and 3, is provided which is activated by an impact triggering device (not shown). The impact triggering device may be of any suitable design and an example thereof can be found in my co-pending application to which reference is above made and which is incorporated herein by reference. Release mechanism 94, when activated by the impact triggering device, permits seat 12 to move freely on guide track arrangement 24 so that due to the momentum of the passenger's body and the weight of seat 12, seat 12 is driven forward, as seen by the direction arrow in FIGS. 8 and 5, thus entrapping the passenger between seat 12 and safety cushion 18, as demonstrated by the dummy 95 in FIG. 5. Preferably, backrest 22 of seat 12, which is suitably cushioned, and the upper body portion 44 of safety cushion 18 are contoured to the human body, as clearly seen in FIG. 8, so that during and subsequent to a collision the passenger is firmly held therebetween, thus resulting in a shorter travel of head and chest stroke for the safety of occupants, the safety mechanism is fully operational just before the actual crash of vehicle occurs.

Release mechanism 94 includes an activating cable, designated 96, a latch bolt, designated 98, and a retaining spring, designated 100. Latch bolt 98 is contained within and its movement guided by a housing, designated 102, which is positioned at right angles to the longitudinal movement of track 30 and, hence, passenger seat 12, as seen by the direction arrow A in FIG. 3. Housing 102 is fixedly connected to chassis 10 and positioned adjacent to a latch opening support, designated 104, which is fixedly connected to frame 42 of passenger seat 12. Latch opening support 104 is provided with a latch opening, designated 106, into which the head, designated 108, of latch bolt 98 is engagable. This engagement between latch bolt 98 and latch opening 106 fixes the positioning of passenger seat 12 and prevents its movement in the longitudinal direction of chassis 10. This fixed positioning of passenger seat 12 is at a predetermined distance from safety cushion 18 such that ample room is provided to the passenger seated in the automobile. Retainer spring 100, which is maintained around latch bolt 98 and between head 108 of the latch bolt and the end 110 of housing 102, serves to maintain latch bolt 98 in engagement with latch opening 106. In order to disengage latch bolt 98 from engagement with latch opening 106, activating cable 96 is connected to the connector 112 of latch bolt 98 by any suitable means. Activating cable 96 is moved in the direction of arrows B and C in FIG. 3 upon the activation thereof by the impact triggering device. This movement of cable 96 is translated, by means of pulley 114, into a movement to latch bolt 98 which is perpendicular to the free movement of seat 12 in the longitudinal direction of chassis 10, as clearly seen by the direction arrow D in FIG. 2.

In order to constrain the passenger by preventing the rearward movement of passenger seat 12 subsequent to a collision, which movement may result in the ejection of the passenger from the automobile seat or otherwise cause injury to the passenger, a ratchet system is provided. This ratchet system, as clearly seen in FIGS. 1, 3 and 8, includes a pawl, designated 116, fixedly connected to frame 42 of seat 12 which engages a ratchet device in the form of an elongated track, designated 118, which runs in the longitudinal direction of chassis 10 and which is provided with a series of latch openings, designated 120, for engagement with pawl 116. Thus, when passenger seat 12 is driven forward during a collision with a passenger seated therein and comes to rest with the passenger positioned between backrest 22 of seat 12 and safety cushion 18, pawl 116 engages with the latch opening 120 at that seat position thereby preventing a return movement of passenger seat 12. Disengagement of pawl 116 from the latch opening 120 is accomplished by pressing release button 122 on the side of passenger seat 12 in the direction of the arrow E, as seen in FIG. 2.

FIG. 4 shows the passenger restraint safety system used in connection with the front seat of a passenger automobile. Thus, safety cushion 18 is formed together with the dashboard of the automobile. Provision is thus made for a chamber, designated 124, behind safety cushion 18 for outlet tube 126 provided for heating, ventilating and air conditioning. Chamber 129 also may be utilized for the necessary electrical wiring and tubing, etc. Louver vents 128 are provided for introducing air and heat to the windshield and to the interior passenger compartment of the vehicle.

Figure 7:
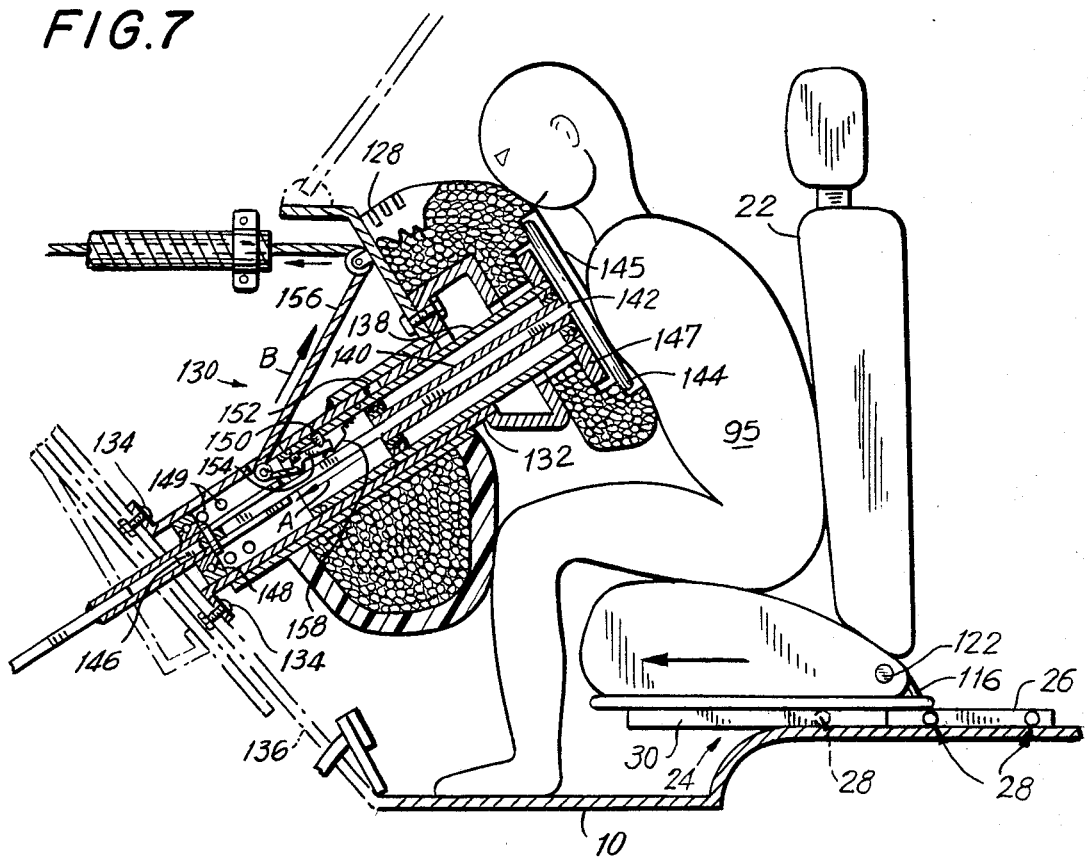
FIG. 7 is a schematic side elevational view, partly in cross-section, showing the effect of the passenger restraint safety system of the present invention during a collision when incorporated with a collapsible steering wheel on the driver's side of the vehicle.

In the case where the passenger in the automobile is seated in the driver's seat rather than a passenger seat, there must also be provision for collapse of the automobile steering wheel in order to prevent injury to the driver-passenger in a collision. Such a safety provision is described in my co-pending application entitled "Vehicle Control Safety System", Ser. No. 366,714, filed Apr. 8, 1982 now U.S. Pat. No. 4,413,702. Thus, in FIG. 7 there is shown a passenger restraint safety system operating in conjunction with a collapsible steering wheel system, designated 130, so that the driver is cushioned between backrest 22 of passenger seat 12 and the soft dashboard safety cushion without impacting upon the steering wheel. Collapsible steering wheel system 130 is fully disclosed in my co-pending application referenced above and is activated to the downward collapsible mode by the impact triggering device also disclosed in said application. There is shown in FIG. 7 a substantially cylindrical steering column housing support 132 fixedly mounted by bolts 134 to the firewall 136 (in phantom) of chassis 10. Telescopically and slideably received in housing support 132 is a steering column or shaft having an outer cylindrical tube 138 and an inner tubular bar 140. Inner tubular bar 140 has a square shaped inner channel in which steering post 142 is securely mounted. Steering post 142 supports steering wheel 144 and is telescopically and slideably received in a tubular extension 146 rotatably supported in housing support 132 by a ball bearing assembly 148. Collapse of the steering column is accomplished by the disengagement of a latch 150 movably mounted in the side wall of cylindrical tube 138 from latch opening 152 in the side wall of housing support 132 to thereby permit the steering column to collapse under the momentum and weight of the driver's body as seen by the direction arrow A in FIG. 7, with the result that the steering wheel 144 together with the circular instrument panel 147 are recessed in the soft safety cushion receptacle 145. Latch 150 is controlled by "L" shaped pivot arm 154 which engages latch 150 at one end and is connected to activation cable 156 at the other end. Spring 158 biases pivot arm 154 to maintain latch 150 in normal engagement with latch opening 152. Activation cable 156 is controlled by the impact triggering device which when activated moves cable 156 in the direction of arrow B, pivoting arm 154 so as to allow the disengagement of latch 150 from latch opening 152 thereby allowing cylindrical tube 138 to telescope into housing support 132. Round air port vents 149 are provided in wall of cylindrical lower portion of housing 152 to permit the air pressure to escape upon the collapse downward sliding of inner tubing 132 without any back-pressure.

It is to be noted that circular instrument panel 147 is placed at the steering wheel column hub for instant and automatic downward collapse upon impact of the front bumper, for the safety of the driver in a crash. The circular instrument panel may be provided with an optional magnifying glass face, condensed for reading at a glance.

In operation, when a passenger opens door 14 for the purpose of entering into the automobile on the passenger side, the opening movement of door 14 exerts a pulling force the opening movement of door 14 exerts a pulling force and movement upon cable 60 which is transmitted through the series of pulleys 64 to plunger 50 which is moved forwardly against spring 56 thereby collapsing safety cushion 18. Simultaneously with such movement air valve 70 is operated to exhaust the air being compressed within the safety cushion compression system 48. The collapsing movement of plunger 50 is transmitted to safety cushion 18 which is collapsed from the position shown in phantom in FIG. 1 to the position shown in solid lines in FIG. 1. Once the passenger is seated on seat 12 and door 14 is closed, cable 60 is released to allow plunger 50 to return to its normally extended position and because of the throttling action of air bleed valve openings 76 in air check valve system 70, the return of safety cushion 18 to its safety position is accomplished slowly. As indicated above, alternatively seat 12 may be moved rearwardly by electro-mechanical means upon the opening of door 14 in order to provide sufficient room for a passenger to enter the automobile and be seated therein. Also, upon closing of door 14, seat 12 is then moved electro-mechanically to a predetermined position in the passenger seating comfort range. The safety system for the automobile is now activated and upon the happening of a collision, an impact triggering device is activated which acts upon activating cable 96 to disengage latch bolt 98 from latch opening 106, thereby releasing passenger seat 12 for free movement on guide track arrangement 24. Because of the forward momentum of the passenger and passenger seat 12, seat 12 is propelled forwardly on guide track arrangement 24 until the passenger comes to rest against safety cushion 18. At this point, pawl 116 engages the latch opening 120 associated with that forward position of seat 12 so that the passenger is encased, in effect, between backrest 22 of seat 12 and safety cushion 18, as seen by the position of dummy 95 in FIG. 5. In the case where the passenger is the driver of the automobile, then, as clearly seen in FIG. 7, the steering wheel 144 additionally collapses under the momentum and weight or movement of the passenger and seat 12 which have moved forward, in the direction of arrow.

It is to be understood that the foregoing general and detailed descriptions are explanatory of the present invention and are not to be interpreted as restrictive of the scope of the following claims.

What is claimed is:

1. A passenger restraint safety system for a passenger type automobile, said automobile having a chassis, a passenger seat including a frame, and a door hingedly connected to said chassis providing access to said passenger seat, said safety system including:
   (a) a guide track system for said passenger seat and frame permitting unrestrained movement of said seat and frame on said guide track system in the longitudinal direction of said chassis;
   (b) a safety cushion in front of said passenger seat contoured to the body of a passenger in the seated position to provide a large body contact area having an upper body portion and a leg portion;
   (c) locking means for locking said passenger seat and frame in a position at a pre-determined distance from said safety cushion to allow free and unrestricted movement to a passenger seated thereon;
   (d) means for releasing said locking means triggered by a collision of said automobile with another object such that said seat and frame are released for unrestrained free movement on said track system whereby the forward momentum of said passenger and said seat cause said seat to move instantaneously toward said safety cushion to restrain said passenger in a seated position therebetween; and
   (e) means for collapsing said safety cushion from a first safety position to a second position farther away from said seat when said door is opened and returning said safety cushion to said first safety position when said door is closed so that a passenger may enter said automobile and be seated therein, said means comprising a plunger located within said safety cushion adapted for movement in a direction away from said seat, means operatively connecting said plunger to the outer fabric of said safety cushion, means for biasing said plunger so that said safety cushion is normally maintained in its first safety position, and means operatively connecting said plunger to said door so that said plunger collapses against said biasing means when said door is opened and is repositioned by said biasing means when said door is closed.

2. The passenger restraint safety system for a passenger type automobile as defined in claim 1, which further includes means to control the return movement of said plunger when said door is closed so that said safety cushion does not return to its first safety position abruptly.

3. The safety system for passenger type automobile as defined in claim 2, wherein said control means includes:
   (a) a hermetically sealed chamber within which said plunger operates fixedly connected to a bulkhead of said chassis;
   (b) an air check valve in said chamber;
   (c) biasing means for biasing said valve to a normally closed position, said biasing means adapted to be overcome by the air pressure within said chamber acting on said valve when said door is opened; and
   (d) means for throttling the air returning to said chamber when said valve is closed so that the return movement of said plunger is controlled.

4. The passenger restraint safety system for a passenger type automobile as defined in claim 3, wherein said throttling means includes at least one air bleed valve in said chamber.

5. The passenger restraint safety system for a passenger type automobile as defined in claim 4, wherein said means operatively connecting said plunger to said door includes a cable, a first end of which is connected to said door at a location such that the opening of said door imparts sufficient movement to said cable to move said plunger and said safety cushion to allow easy access to said automobile by a passenger, the second end of said cable being connected to said plunger, and a plurality of pulleys fixedly connected to said chassis through which said cable is guided so that movement of said plunger occurs upon the opening of said door.

6. The passenger restraint safety system for a passenger type automobile as defined in claim 1 wherein the means operatively connecting said plunger to the outer fabric of said safety cushion includes a channel member transversely positioned in said safety cushion fixedly connected to said plunger and means connecting the length thereof to the outer fabric of said safety cushion.

7. The passenger restraint safety system for a passenger type automobile as defined in claim 6, which further includes means for preventing rotational movement of said plunger and said channel member.

8. A passenger restraint safety system for a passenger type automobile having a passenger seat and at least one door, including:
   (a) a safety cushion in front of said passenger seat contoured to the body of a passenger in the seated position having an upper body portion and a leg portion; and
   (b) means for collapsing said safety cushion from a first safety position to a second position farther away from said seat when said door is opened and returning said safety cushion to said first safety position when said door is closed so that a passenger may enter said automobile and be seated therein, said means comprising a plunger located within said safety cushion adapted for movement in a direction away from said seat, means operatively connecting said plunger to the outer fabric of said safety cushion, means for biasing said plunger so that said safety cushion is normally maintained in its first safety position, and means operatively connecting said plunger to said door so that said plunger collapses against said biasing means when said door is opened and is repositioned by said biasing means when said door is closed.

9. The passenger restraint safety system for a passenger type automobile as defined in claim 8, which further includes means to control the return movement of said plunger when said door is closed so that said safety cushion does not return to its first safety position abruptly.

10. The safety system for a passenger type automobile as defined in claim 9, wherein said control means includes:
   (a) a hermetically sealed chamber within which said plunger operates fixedly connected to a bulkhead of said chassis;
   (b) an air check valve in said chamber;
   (c) biasing means for biasing said valve to a normally closed position, said biasing means adapted to be overcome by the air pressure within said chamber acting on said valve when said door is opened; and
   (d) means for throttling the air returning to said chamber when said valve is closed so that the return movement of said plunger is controlled.

11. The passenger restraint safety system for a passenger type automobile as defined in claim 10, wherein said throttling means includes at least one air bleed valve in said chamber.

12. The passenger restraint safety system for a passenger type automobile as defined in claim 11, wherein said means operatively connecting said plunger to said door includes a cable, a first end of which is connected to said door at a location such that the opening of said door imparts sufficient movement to said cable to move said plunger and said safety cushion to allow entrance to said automobile by a passenger, the second end of said cable being connected to said plunger, and a plurality of pulleys fixedly connected to said chassis through which said cable is guided so that movement of said plunger occurs upon the opening of said door.

* * * * *